UNITED STATES PATENT OFFICE.

CHARLES HUGH MOORE, OF BOWLING GREEN, KENTUCKY.

DISINFECTANT.

SPECIFICATION forming part of Letters Patent No. 370,277, dated September 20, 1887.

Application filed February 21, 1887. Serial No. 228,433. (No specimens.)

*To all whom it may concern:*

Be it known that I, CHARLES HUGH MOORE, a citizen of the United States, residing at Bowling Green, in the county of Warren and State of Kentucky, have invented a new and useful Composition of Matter to be Used as a Disinfectant, of which the following is a specification.

My composition consists of the following ingredients, combined in the proportions stated, viz: ferri sulphas, (sulphate of iron,) sixteen ounces; slaked lime, four ounces; sulphate of zinc, two ounces; nitrate of potassa, (saltpeter,) two ounces; charcoal, two ounces; nutmeg, one-fourth ounce; carbolic acid, (crystallized,) one-half ounce. These ingredients are to be thoroughly mingled by the use of a mortar and pestle.

By the use of the above composition sleeping-rooms, hospitals, privies, vaults, dairies, and all inclosed apartments can be speedily and thoroughly disinfected.

What I claim, and desire to secure by Letters Patent of the United States, is—

The herein-described composition of matter to be used as a disinfectant, consisting of ferri sulphas, (sulphate of iron,) slaked lime, sulphate of zinc, nitrate of potassa, (saltpeter,) charcoal, nutmeg, and carbolic acid, (crystallized,) in the proportions specified.

CHARLES HUGH MOORE.

Witnesses:
CHARLES DRAKE,
W. E. MISE.